US012708942B2

(12) United States Patent
Freytag et al.

(10) Patent No.: US 12,708,942 B2
(45) Date of Patent: Aug. 18, 2026

(54) METHOD AND APPARATUS FOR ADDITIVE MANUFACTURING OF A WORKPIECE USING STATISTICAL LEARNING MODEL

(71) Applicant: Carl Zeiss Industrielle Messtechnik GmbH, Oberkochen (DE)

(72) Inventors: Alexander Freytag, Erfurt (DE); Thomas Milde, Nausnitz (DE); Ghazal Ghazaei, Munich (DE)

(73) Assignee: Carl Zeiss Industrielle Messtechnik GmbH, Oberkochen (DE)

(*) Notice: Subject to any disclaimer, the term of this patent is extended or adjusted under 35 U.S.C. 154(b) by 708 days.

(21) Appl. No.: 18/171,201

(22) Filed: Feb. 17, 2023

(65) Prior Publication Data

US 2023/0294173 A1 Sep. 21, 2023

Related U.S. Application Data

(63) Continuation of application No. PCT/EP2021/070751, filed on Jul. 23, 2021.

(30) Foreign Application Priority Data

Aug. 19, 2020 (DE) ......................... 102020121760.9
Oct. 9, 2020 (DE) ......................... 102020126571.9
Jan. 29, 2021 (DE) ......................... 102021102125.1

(51) Int. Cl.
*B22F 10/85* (2021.01)
*B22F 10/28* (2021.01)
(Continued)

(52) U.S. Cl.
CPC .............. *B22F 10/85* (2021.01); *B22F 10/28* (2021.01); *B22F 10/38* (2021.01); *B22F 12/90* (2021.01); *B33Y 10/00* (2014.12); *B33Y 50/02* (2014.12)

(58) Field of Classification Search
CPC .......... B22F 10/85; B22F 10/28; B22F 10/38; B22F 12/90; B33Y 10/00; B33Y 50/02;
(Continued)

(56) References Cited

U.S. PATENT DOCUMENTS 11,273,595 B2 3/2022 Richardson et al.
11,506,485 B2 11/2022 Stoppe
(Continued)

FOREIGN PATENT DOCUMENTS

CN 110163858 A 8/2019
CN 110475635 A 11/2019
(Continued)

OTHER PUBLICATIONS

Ronneberger et. al.; U-Net: Convolutional Networks for Biomedical Image Segmentation; Medical Image Computing and Computer-Assisted Intervention (MICCAI); dated May 18, 2015; pp. 1-8.
(Continued)

*Primary Examiner* — Michael J Brown
(74) *Attorney, Agent, or Firm* — Miller Johnson

(57) ABSTRACT

A method for additive manufacture of a workpiece includes obtaining a dataset defining the workpiece in multiple workpiece layers. The method includes producing a respective layer and capturing an image of the layer. The method includes feeding the image to a statistical learning model to determine a defect vector of defect probabilities each indicating whether a respective layer defect is present. The method includes, in response to no layer defects being present, selectively solidifying the layer. The method includes, in response to at least one defect being present, reworking or reproducing the layer and repeating the recording and the feeding to determine the defect vector again. The method includes repeating the producing, the recording, the feeding, and the selectively solidifying such that further
(Continued)

layers are produced one on top of the other. The respective material layers each are inspected using the previously trained statistical learning model.

19 Claims, 6 Drawing Sheets

(51) Int. Cl.

| | |
|---|---|
| ***B22F 10/38*** | (2021.01) |
| ***B22F 12/90*** | (2021.01) |
| ***B33Y 10/00*** | (2015.01) |
| *B29C 64/393* | (2017.01) |
| *B33Y 50/02* | (2015.01) |
| *G06N 3/09* | (2023.01) |

(58) Field of Classification Search

CPC ........ B33Y 30/00; G06N 3/084; G06N 3/044; G06N 3/0442; G06N 3/045; G06N 3/0455; G06N 3/0464; G06N 3/09; G06N 3/096; Y02P 10/25; B29C 64/153; B29C 64/393; G05B 23/0243

USPC .......................................................... 700/118

See application file for complete search history.

(56) References Cited

U.S. PATENT DOCUMENTS

| | | | | |
|---|---|---|---|---|
| 11,633,918 | B2 | 4/2023 | Totzeck et al. | |
| 2015/0061170 | A1 | 3/2015 | Engel | |
| 2017/0312821 | A1* | 11/2017 | DeFelice | B22F 10/50 |
| 2018/0099333 | A1 | 4/2018 | DehghanNiri et al. | |
| 2019/0283333 | A1 | 9/2019 | Hwang | |
| 2020/0043179 | A1 | 2/2020 | Chauvin | |
| 2020/0158499 | A1 | 5/2020 | Stoppe | |
| 2020/0160497 | A1 | 5/2020 | Shah | |
| 2020/0217807 | A1* | 7/2020 | Safai | G01N 23/18 |
| 2022/0036538 | A1* | 2/2022 | Steiman | G06N 3/0464 |

FOREIGN PATENT DOCUMENTS

| | | | |
|---|---|---|---|
| CN | 110799286 | A | 2/2020 |
| CN | 111007073 | A | 4/2020 |
| CN | 111151751 | A | 5/2020 |
| DE | 102016201289 | A1 | 8/2017 |
| DE | 102017108874 | A1 | 10/2018 |
| DE | 102018124569 | A1 | 4/2020 |
| EP | 3459715 | A1 | 3/2019 |
| EP | 3646968 | A1 | 5/2020 |
| GB | 2572953 | A | 10/2019 |
| WO | 2015020939 | A1 | 2/2015 |
| WO | 2018064349 | A1 | 4/2018 |

OTHER PUBLICATIONS

Milletari F et. al.; V-Net: Fully Convolutional Neural Networks for Volumetric Medical Image Segmentation; In 2016 Fourth International Conference on 3D Vision (3DV); dated Jun. 15, 2016; pp. 1-11.

Diba et. al.; Temporal 3D ConvNets: New Architecture and Transfer Learning for Video Classification; arXiv preprint arXiv:1711. 08200, Nov. 22, 2017; pp. 1-9.

Nabavi, Seyed et. al.; Future Semantic Segmentation with Convolutional LSTM; dated Jul. 20, 2018; pp. 1-12.

Shi et.al.; Convolutional LSTM network: A Machine Learning Approach For Precipitation Nowcasting; InAdvances in neural information processing systems; dated 2015; pp. 1-9.

Gers et al.; Learning to Forget Continual Prediction with LSTM; 20 pages; dated Jun. 9, 2016.

Clijsters et. al.; In Situ Quality Control of the Selective Laser Melting Process Using a High-Speed, Real-Time Melt Pool Monitoring System; Int J Adv MsinufTechnol (2014); Springer-Verglag London; dated Aug. 10, 2014; pp. 1089-1101.

Saeid et. al.; Deep Semantic Segmentation of Natural and Medical Images: A Review; https://arxiv.org/pdf/1910.07655.pdf; dated Jun. 3, 2020; pp. 1-45.

* cited by examiner

METHOD AND APPARATUS FOR ADDITIVE MANUFACTURING OF A WORKPIECE USING STATISTICAL LEARNING MODEL

CROSS-REFERENCE TO RELATED APPLICATIONS

This application is a continuation of International Application No. PCT/EP2021/070751 filed Jul. 23, 2021, which claims priority to German patent application 102020121760.9 filed Aug. 19, 2020, German patent application 102020126571.9 filed Oct. 9, 2020, and German patent application 102020102125.1 filed Jan. 29, 2021. The entire disclosures of the above applications are incorporated by reference.

FIELD

The present disclosure relates to additive manufacturing and more particularly to using a statistical learning model to identify defects during the additive manufacturing process.

BACKGROUND

The present invention relates to methods and apparatus for the additive manufacturing of a workpiece, and more particularly to methods and apparatus for the additive manufacturing of a workpiece using one or more camera images for in-process quality control.

Additive methods for the manufacture of workpieces are sometimes referred to as 3D printing. There are various additive manufacturing methods. In selective laser sintering (SLS) or selective laser melting (SLM), use is made of what is known as a powder bed formed from a particulate material. The particulate material is often a metal material. However, there are also methods involving particulate synthetic materials, in particular polymers. Selected powder particles on the top of the powder bed are locally and selectively melted or at least start to be melted with the aid of a laser beam or electron beam, and are thereby selectively solidified when cooling. A new powder layer is then distributed over the workpiece structure and the non-melted remaining powder, and the workpiece is thus manufactured layer by layer. The individual workpiece layers are often produced from the bottom upward on a production platform that is lowered following each workpiece layer by the corresponding layer height.

The additive manufacture of workpieces makes it possible to manufacture individual workpieces with a high degree of complexity and low material outlay. At the same time, however, there are major challenges with regard to workpiece quality, since anomalies, which may lead to defects in the workpiece, may occur in any individual material layer. Anomalies may result in defects, such as for instance pores in the layer structure, micropores, local layer detachments/delamination, tears internally and/or on the surface, bumps, shape discrepancies and/or material stresses. For this reason, there are numerous suggestions for detecting defects as early as possible during the manufacture of the layer sequence in an additively manufactured workpiece. By way of example, US 2015/0061170A1 discloses inter alia an optical measuring sensor having a camera that may be configured to allow a 3D coordinate measurement on the respective uppermost material layer. One difficulty in this case is reflections and shadows that may be caused in particular by metal powder particles, but also by other objects in the working space of the device.

DE 10 2016 201 289 A1 discloses a method for the additive manufacture of a workpiece, wherein first measured data are acquired during the additive construction by way of a thermographic material test or by way of an eddy current material test. Second measured data are acquired following the additive manufacture with the aid of computed tomography and are compared with the first measured data. Results of the material test are intended to be classified using an algorithm, not described in more detail, from the field of supervised machine learning.

EP 3 459 715 A1 discloses a method for the additive manufacture of a workpiece, wherein defects in a current layer or in following further layers are intended to be predicted with the aid of a classification function that has been trained using a technique, not described in more detail, from the field of machine learning.

WO 2015/020939 A1 discloses a method, based on the processing of filaments, for the additive manufacture of a workpiece, wherein a CAD input dataset is intended to be correlated with parameters of the manufacturing device with the aid of algorithms from the field of machine learning in order to predict the properties of the workpiece manufactured by the device and the time required for manufacture. The actual quality control of the manufactured workpiece takes place after the manufacture thereof using a 3D scanner and with the aid of calibration patterns on the production platform.

DE 10 2017 108 874 A1 and US 2020/158499 A1 of the same priority disclose an optical system for enabling a material test with the aid of illumination from multiple different directions. In some variants, the system may be used to determine an elevation map of a material layer to be tested.

SUMMARY

In view of this background, it is an object of the invention to provide improved methods and apparatus for the additive manufacture of high-quality workpieces. It is another object to provide methods and apparatus that allow to efficiently monitor the quality of the material layers in order to be able to correct any occurring layer defects early on. It is yet another object to provide methods and apparatus that can monitor the quality of the workpiece layers during layer production close to the process.

According to a first aspect, there is provided a method for the additive manufacture of a workpiece, comprising the following steps: obtaining a dataset that defines the workpiece in a plurality of workpiece layers arranged one on top of another; producing a respective material layer having a defined material surface formed from a particulate material; recording at least one image of the respective material layer; feeding the at least one image to a previously trained statistical learning model in order to determine at least one defect vector representing a plurality of individual defect probabilities, with each individual defect probability from the plurality of individual defect probabilities representing an individual indicator as to whether or not a defined layer defect from a plurality of possible layer defects is present in the respective material layer; if the plurality of individual defect probabilities indicate that no defined layer defect from the plurality of possible layer defects is present in the respective material layer, selectively solidifying the particulate material on the defined surface with the aid of a structuring tool on the basis of the dataset in order to thereby produce a defined workpiece layer from the plurality of workpiece layers; if the plurality of individual defect probabilities indicate that at least one defined layer defect from the plurality of possible layer defects is present in the respective material layer, reworking or reproducing the respective material layer, and repeating the steps of recording and feeding in order to determine the at least one defect vector again; and repeating the steps of producing, recording, feeding and selectively solidifying such that further defined workpiece layers from the plurality of workpiece layers are produced one on top of the other, wherein the respective material layers each are inspected using the previously trained statistical learning model.

According to another aspect, there is provided a method for the additive manufacture of a workpiece, comprising the following steps: obtaining a dataset that defines the workpiece in a plurality of workpiece layers arranged one on top of another; producing a material layer having a defined surface formed from a particulate material; recording at least one image of the material layer and inspecting the material layer based on the at least one image in order to determine individual properties of the material layer; selectively solidifying the particulate material on the defined surface with the aid of a structuring tool using the dataset and on the basis of the individual properties of the material layer, such that a defined workpiece layer from the plurality of workpiece layers is produced from the material layer; and repeating the steps of producing, recording and selectively solidifying, such that further defined workpiece layers from the plurality of workpiece layers are produced; wherein the at least one image of the material layer is inspected using a previously trained statistical learning model; wherein the previously trained statistical learning model is used to determine at least one defect vector that represents a plurality of individual defect probabilities; wherein each individual defect probability from the plurality of individual defect probabilities is an individual indicator as to whether or not a defined layer defect from a plurality of possible layer defects is present in the material layer; and wherein the step of selectively solidifying is carried out on the basis of the at least one defect vector According to yet another aspect, there is provided an apparatus for the additive manufacture of a workpiece, comprising a memory configured for obtaining a dataset that defines the workpiece in a plurality of workpiece layers arranged one on top of another, comprising a production platform, comprising a layer-forming tool, comprising a structuring tool, comprising a camera oriented toward the production platform, and comprising an evaluation and control unit configured to produce a material layer having a defined surface from a particulate material on the production platform with the aid of the layer-forming tool, to record at least one image of the material layer with the aid of the camera, to feed the at least one image to a previously trained statistical learning model in order to determine at least one defect vector representing a plurality of individual defect probabilities, with each individual defect probability from the plurality of individual defect probabilities representing an individual indicator as to whether or not a defined layer defect from a plurality of possible layer defects is present in the respective material layer, to selectively solidify the particulate material on the defined surface with the aid of the structuring tool, such that a defined workpiece layer from the plurality of workpiece layers is produced from the material layer, if the plurality of individual defect probabilities indicate that no defined layer defect from the plurality of possible layer defects is present in the respective material layer, and to rework or reproduce the respective material layer, if the plurality of individual defect probabilities indicate that at least one defined layer defect from the plurality of possible layer defects is present in the respective material layer.

According to yet another aspect, there is provided a method for training a statistical learning model for use in one of the aforementioned methods and apparatus, comprising the following steps: obtaining a plurality of training images that show a plurality of material layers, wherein the plurality of material layers shown in the training images contain a plurality of possible layer defects; marking the plurality of possible layer defects in the plurality of training images in order to obtain a plurality of annotated versions of the plurality of training images; defining a stop criterion based on the plurality of annotated versions of the plurality of training images; repeatedly feeding the plurality of training images to the statistical learning model as input data and repeatedly obtaining output data from the statistical learning model in response to the plurality of training images, with the output data comprising the at least one defect vector; and iteratively optimizing the statistical learning model using the plurality of training images and the stop criterion.

The plurality of training images may contain a plurality of groups of in each case at least three and in particular in each case four training images, wherein the training images of each group each show a defined material layer having at least one layer defect, and wherein the training images of each group show the defined material layer with mutually different illumination directions. The training images, in terms of number and illumination, preferably correspond to those images that are inspected in accordance with the aforementioned methods using the previously trained statistical learning model, and so the explanations below also apply analogously to the training images.

In some example embodiments, the training images may be recorded during the manufacture of a defined workpiece and the stop criterion may be defined on the basis of the defined workpiece. In these preferred example embodiments, an already trained learning model may advantageously be "retrained" in a current manufacturing process for manufacturing an individual workpiece, such that the learning model is optimized in relation to the individual workpiece. Further workpieces of the same type may then highly advantageously be manufactured in subsequent further manufacturing processes using the learning model retrained in this way. In some advantageous example embodiments, the learning model may be iteratively retrained based on multiple manufacturing processes in each of which workpieces of the same type are manufactured until a specified workpiece property or specified workpiece properties is or are achieved. The stop criterion may advantageously be defined on the basis of the specified workpiece properties. The plurality of possible layer defects may, in preferred example embodiments, be marked by a person having experience with the layer defects to be detected.

The statistical learning model of the methods and apparatus originates from the field of machine learning. Here, it implements statistical evaluation of the at least one image of the material layer based on previously trained parameters and, here, delivers individual probability values that each represent an individual probability of the presence of a defined layer defect from a plurality of possible layer defects. The plurality of possible layer defects, in the preferred example embodiments, may include ridges on the surface of the material layer formed from the particulate material, local agglomerations of particulate material on the defined surface, non-uniform grain sizes of the particulate material, holes or depressions on the surface of the material layer formed from the particulate material or unwanted adhesion or melting of material particles. Such anomalies/inhomogeneities may lead to workpiece defects such as mentioned further above. Since the material layer is inspected for the presence of such anomalies with the aid of the previously trained statistical learning model, occurrence of such defects can be detected early on. As a result, propagation of the defects can be avoided or corrected or, as an alternative, the printing process may be stopped in order to save material and time. The selective solidification of the particulate material is accordingly carried out on the basis of the at least one defect vector. This may include no longer carrying out the step of solidifying due to a recognized or emerging defect, or carrying out the solidification step in a modified manner, for instance with modified CAD data, or first reworking the material layer formed from the particulate material and then carrying out the selective solidification on the reworked material layer.

Using the previously trained statistical learning model efficiently allows inspection close to the process of the material layer, both prior to the selective solidification of the particulate material and thereafter. Inspecting the material layer prior to the selective solidification makes it possible to correct any anomalies prior to the selective solidification, for example by smoothing the surface of the material layer, distributing further particulate material and/or exchanging existing particulate material. Inspecting the material layer following the selective solidification furthermore makes it possible to correct recognized defects on the only partially manufactured workpiece by reworking an already manufactured workpiece layer, such as for example starting to melt it or melting it, and/or by modifying subsequent workpiece layers, such as for example making them thicker or thinner.

The statistical learning model delivers individual defect probabilities with regard to the various layer defects and allows a surface inspection that builds on empirical knowledge without each individual layer defect already having to be known precisely beforehand in terms of its exact appearance in at least one image of the material layer. The statistical learning model preferably delivers an individual defect probability for a plurality of different layer defects, so as to obtain, for each layer defect that comes into consideration, an individual defect probability that represents the presence or absence of the respective layer defect. In contrast to the prior art methods mentioned at the outset, an algorithm from the field of machine learning is thus applied here in a new and useful manner to the inspection of the powder bed comprising the material layer formed from the particulate material, and not or not just to the behavior and the properties of the device used for the additive manufacture and/or in relation to already manufactured workpiece layers. The novel methods and the corresponding apparatus very efficiently contribute to avoiding defective workpieces and workpiece layers as early as possible in advance. The defect vector containing the individual defect probabilities for the various layer defects very efficiently makes it possible to give a qualitative and—at least in some example embodiments—even a quantitative statement (such as for instance the size or distribution of recognized layer defects) in relation to the quality properties of the manufactured workpiece.

In some example embodiments, the selective solidification of the particulate material may be stopped or deferred on the basis of the defect vector until the material layer formed from the particulate material has a desired homogeneity achieved through suitable reworking. In some example embodiments, the manufacturing process may be stopped early when a defect-free workpiece cannot be expected due to layer defects that are recognized with a high probability. Since various layer defects, depending on a specific process sequence, may occur at the same time or at different times from one another, in a manner locally remote from one another or in direct proximity or to different extents, an inspection of the powder bed based on machine learning methods using the trained statistical learning model is highly advantageous. When the process parameters change, the statistical learning model may efficiently be "retrained". The abovementioned object is therefore completely achieved.

In a preferred refinement, the material layer is illuminated from multiple mutually different directions and a plurality of images of the material layer is recorded, wherein each image from the plurality of images shows the material layer with a different illumination direction, and wherein the individual properties are determined using the plurality of images.

The refinement is particularly advantageous for inspecting a powder bed formed from a metal particulate material. However, it may be used in the same way to inspect a powder bed formed from synthetic material or mixed materials. The plurality of images show the material layer with mutually different light reflections and mutually different shadows. The individual properties of the material layer are therefore able to be acquired more reliably and in more detail. It is advantageous for the plurality of images to be recorded with a single camera that is arranged in a fixed position relative to the production platform and/or to the material layer. This allows fast image recording and simple assignment of the different illumination images to one another. The refinement in particular makes it easier to semantically distinguish between different layer defects, since it allows a detailed inspection of the material surface. The material layer is preferably illuminated from at least three, in particular from four mutually different directions and the plurality of images thus includes at least three, in particular four images that show the material layer with a respectively different illumination direction. In preferred example embodiments, the images show the material layer as is recorded by the camera with the respective illumination. The images may advantageously be rectified and/or corrected for distortion. It is additionally possible to correct inhomogeneities in the illumination, for instance caused by production tolerances in the light sources that are used. However, the images in the preferred example embodiments show the material layer as such, and not for instance a filtered view, or a view otherwise modified with regard to the pixel information, of the material layer, because this allows a particularly fast and efficient inspection in the ongoing manufacturing process.

In a further refinement, the plurality of images are supplied together to the previously trained statistical learning model as input data.

In this refinement, each image from the plurality of images may form an inspection channel. The statistical learning model may process the image information from the various illumination images together and therefore correlate the various image information. By way of example, in the case of illumination from a first direction, an edge may be visible in the material layer that is not visible in the case of illumination from another direction. On the other hand, a reflection that occurs in the case of one illumination direction may resemble a layer defect that is not actually present. The refinement advantageously contributes to recognizing as many layer defects that are actually present as possible and also to distinguishing between layer defects that are actually present and layer defects that only appear to be present. Established statistical learning models from the field of machine learning, some of which are described in more detail further below, commonly allow the joint processing of multiple input datasets, such as for instance the separate RGB color channels of a multicolor image. The refinement advantageously uses this ability for the correlated analysis of the plurality of images with different illumination directions. As a result, this refinement may be implemented relatively easily, and it allows very fast inspection of the material surface.

In a further refinement, an elevation map of the material layer is determined using the at least one image, and the elevation map is supplied to the trained statistical learning model as input dataset.

In preferred example embodiments, the elevation map may be determined using a plurality of images that show the material layer in each case with a different illumination direction. The elevation map may preferably be determined as a 2.5D elevation map using a method as described in DE 10 2017 108 874 A1 mentioned at the outset and US 2020/158499 A1 having the same priority, which are hereby incorporated by reference. As an alternative or in addition, the elevation map, in further example embodiments, could be determined in accordance with the triangulation principle, for instance in accordance with the strip light projection principle. The refinement has the advantage that the statistical learning model in each case obtains currently measured height information. The scope of the training data and the training time required beforehand for the statistical learning model may thereby be reduced. Highly critical layer defects, such as in particular missing material or deep ridges due to a damaged layer-forming tool, may already be recognized very quickly based on the elevation map.

In a further refinement, a plurality of defect vectors are determined, each representing a plurality of individual defect probabilities, wherein each defect vector from the plurality of defect vectors represents the individual defect probabilities in relation to a selected pixel region in the at least one image. The selected pixel regions in this refinement are at least partially different from one another, such that the defect vectors are representative of mutually different pixel regions of the at least one image.

It is particularly advantageous for each defect vector from the plurality of defect vectors to represent the individual defect probabilities in relation to another individual pixel in the at least one image.

In these refinements, the defect vectors indicate the probabilities of defined layer defects in locally delimited regions, and in particular on the pixel level. The refinements make it possible to determine the extent and/or shape of any layer defects that are present and/or their spatial profile. Defect vectors that relate to individual pixels in the at least one image in particular allow highly precise determination of the dimensions of recognized layer defects, such that for example it is possible to estimate a pore size in the layer sequence of the workpiece. The refinement contributes to a particularly efficient implementation of the novel method and of the corresponding device since, on the basis of the individual requirements on the manufactured workpiece, layer defects that do not exceed a particular size, shape or form are able to be tolerated in a targeted manner. Advantageous classification of individual layer defects and workpiece defects possibly resulting therefrom is also made easier with this refinement.

In a further refinement, morphological and/or dimensional properties of a defined defect in the material layer are determined using the plurality of defect vectors.

Morphological properties provide information about the structure and/or type of a defined defect. Dimensional properties provide information about extent and/or shape. Determining the morphological and/or dimensional properties makes it easier to classify any layer defects and to make a targeted decision as to whether the manufactured workpiece is able to meet defined specifications with regard to solidity, durability, shape and/or dimensions. The refinement is therefore particularly advantageous for efficient process analysis.

In a further refinement, the previously trained statistical learning model includes a convolutional neural network (CNN). The trained statistical learning model particularly preferably includes a convolutional neural network having an encoder/decoder architecture, for example what is known as a U-net.

A convolutional neural network uses inter alia the mathematical operation “convolution” in order to analyze an input dataset. Filter matrices are convolved in multiple steps in sections with the at least one image. The result of this convolution is a dataset from which it is possible to estimate the presence or absence of a feature represented by the filter. Multiple such convolution operations are preferably carried out sequentially in succession. Filter matrices are advantageously used for each relevant layer defect. By way of example, in each case one or more filter matrices may be provided for one or more of the following layer defects: Ridges on the surface of the material layer formed from the particulate material, local agglomerations of particulate material on the defined surface, non-uniform grain sizes of the particulate material, holes or depressions on the surface of the material layer formed from the particulate material, adhesion or melting of material particles. The plurality of convolution operations may contain conventional convolution operations (convolutions) and/or modified convolution operations such as strided convolution, atrous convolution or transposed convolution and leads, together with further operations performed by the convolutional neural network, such as in particular normalization operations, pooling operations and delinearization (for example with the aid of a rectifying linear unit, ReLU), to the defect vector. As demonstrated by tests, such a convolutional neural network makes it possible to determine a defect vector that is representative of said layer defects in a highly efficient manner.

A convolutional neural network having an encoder/decoder architecture, for instance based on the U-net model, supplements the determination of the defect vector in further subsequent convolution steps with information from the first convolution steps (what is known as upsampling) and thus delivers very accurate segmentation of the at least one image into different layer defect regions and a defect-free image background. Such convolutional networks are conventionally used in the medical field. Tests have shown that such networks are very well suited specifically to the inspection of the material layer formed from particulate material in order to detect layer defects even very early on and in an accurate manner.

In a further refinement, the at least one image of the material layer is normalized with the aid of a reference image, wherein the reference image shows a homogeneous, diffusely reflective surface or a defect-free material layer.

This refinement improves accuracy when detecting any layer defects, since the previously trained statistical learning model obtains one or more input images that are independent of the individual illumination. Disadvantageous effects caused by production tolerances during the illumination, aging phenomena, different relative positions of individual illumination elements in the working space of the device relative to the camera and the like may thereby be reduced. In some example embodiments, the homogeneous, diffusely reflective surface of the reference image may be a white sheet of paper. The reflection properties of the diffusely reflective surface preferably correspond here to a Lambertian emitter. In other preferred example embodiments, each image from the plurality of images is normalized with a reference image that shows the defect-free material layer with that illumination direction in which the corresponding image from the plurality of images was recorded. The image of the defect-free material layer may advantageously be low-pass-filtered. Such normalization allowed particularly good inspection results.

In a further refinement, the at least one defect vector is stored, together with a timestamp that identifies the material layer, as a historical defect vector, wherein the further defined workpiece layers are produced on the basis of the historical defect vector.

In some example embodiments, it may therefore be checked in the inspection of subsequent material layers, whether a layer defect detected in the current material layer is persistent over multiple layers. The refinement contributes to reducing "false alarms" and to stopping and/or modifying the selective solidification of the particulate material of a current material layer only when this is actually necessary to achieve a required workpiece quality. By way of example, individualized layer defects that are limited to one material layer or even apparent layer defects that are actually not present at all and for example appear to be so due to light reflections may efficiently be eliminated. In some example embodiments, the respective current defect vector may be compared with one or more historical defect vectors in a determined manner following the inspection with the aid of the statistical learning model, that is to say as part of post-processing. By way of example, a potential layer defect may be ignored when the historical defect vectors do not indicate the same layer defect in previous material layers.

In a further refinement, the at least one image of the material layer is stored, together with a timestamp that identifies the material layer, as a historical image, wherein the further defined workpiece layers are produced on the basis of the historical image.

In this refinement, which may be used as an alternative or in addition to the abovementioned refinement, the history of recognized layer defects is provided with the aid of the recorded images. The refinement makes it possible to supply one or more historical images, together with a respective current image, to the trained learning model as common multichannel input dataset. The statistical learning model may advantageously then perform the inspection of the material surface taking the history into consideration and recognize temporal correlations. In preferred example embodiments, the at least one current image and one or more historical images may each form a channel of a convolutional neural network. In further example embodiments, the statistical learning model may have a short-term memory, as implemented for instance by an LSTM (Long Short Term Memory) network. In some example embodiments, the statistical learning model may accordingly be a convolutional neural LSTM network.

This refinement may particularly advantageously be combined with the determination of an elevation map of the material layer, wherein a convolutional neural network that carries out the convolution operations in three dimensions is applied. By way of example, the first two dimensions may be the spatial pixel information along the X axis and Y axis of the elevation map, and the third dimension of the convolution operations may be time, wherein the current elevation map and one or more historical elevation maps are used. The input dataset may for example be a tensor the dimensions of which correspond to the width and height of the elevation maps and to the number of historical and current elevation maps. The refinement allows a highly advantageous implementation of the novel method and of the corresponding device with monitoring of the manufacturing process for a plurality of different workpieces and process sequences.

In a further refinement, the individual properties of the material layers are each stored together with a timestamp that identifies the respective material layers, wherein the workpiece is authorized for use on the basis of the stored individual properties.

In this refinement, the inspection of the material layers that accompanies the process may advantageously be used to assess the suitability of the manufactured workpiece for its intended use following the conclusion of the manufacturing process. The stored individual properties may advantageously also be used to document a quality assurance process. The refinement contributes in a highly efficient manner to achieving a high product quality in an additive manufacturing process.

It goes without saying that the features mentioned above and the features yet to be explained below may be used not only in the respectively specified combination but also in other combinations or individually without departing from the scope of the present invention.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
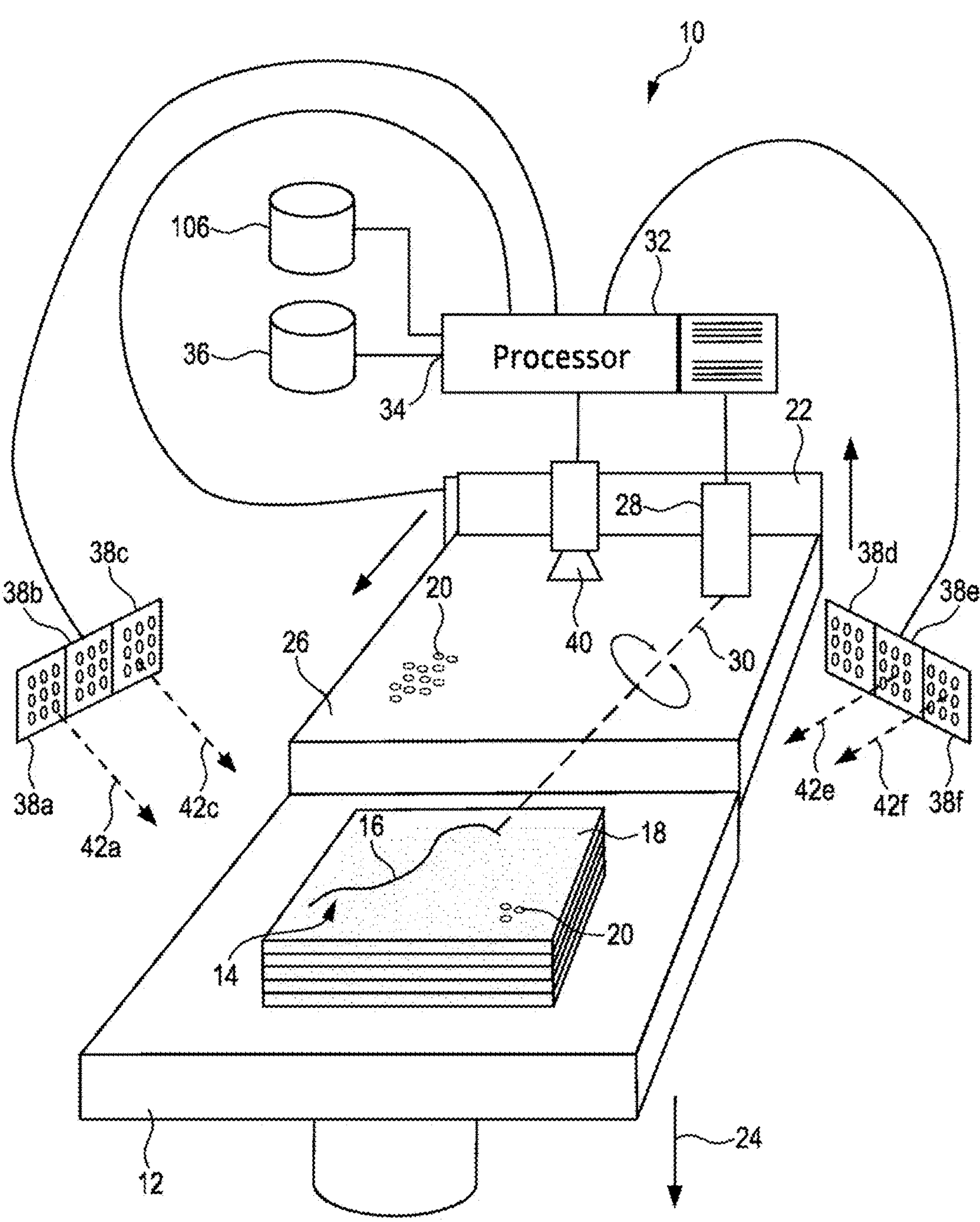
FIG. 1 is a schematic illustration of one example embodiment of the novel device.

In FIG. 1, an example embodiment of the novel apparatus is denoted overall with the reference numeral 10. The apparatus 10 has a production platform 12 on which a workpiece 14 is additively manufactured here according to one example embodiment of the novel method. The workpiece 14 is constructed in layers from a material stack from the bottom upward in temporally successive steps. Reference numeral 16 indicates an instantaneously uppermost workpiece contour or uppermost workpiece layer. An uppermost material layer from which the workpiece layer 16 is produced is denoted with the reference numeral 18.

After a respective workpiece layer 16 has been finished, a new material layer 18 formed from a particulate material 20, for instance a metal material and/or a synthetic material, is distributed over the layer stack here with the aid of a doctor blade 22. For this purpose, the production platform 12 is typically lowered in the direction of the arrow 24 by the height of the next material layer, and the particulate material 20 is taken from a reservoir 26 and distributed over the existing layer stack with the aid of the doctor blade 22.

Reference numeral 28 here illustrates a structuring tool in simplified form. In some example embodiments, the structuring tool 28 generates a laser beam 30 and moves it relative to the production platform 12 and to the material layer 18 to be structured. The laser beam 30 selectively melts and/or starts to melt the material particles, such that they solidify when cooled.

In other example embodiments, the structuring tool 28 may generate an electron beam in order to structure a workpiece layer on the production platform 12. In some example embodiments, the apparatus 10 may contain more than one structuring tool 28, that is to say for instance use two or more laser beams and/or electron beams to produce a workpiece layer.

The structuring tool 28, hereinafter sometimes referred to simply as writing laser, is connected to an evaluation and control unit, controller 32 below for short, which controls the movement of the laser beam 30 along the material surface. The controller 32 here has an interface 34 by way of which it is possible to read in a dataset 36 that defines the workpiece 14 to be manufactured in a plurality of successively arranged layers. The controller 32 controls the movement of the laser beam 30 relative to the material stack on the basis of the dataset 36, wherein the laser beam 30, in each workpiece layer 16 to be manufactured, describes a trajectory that results from the dataset 36. In some example embodiments, the controller 32 is implemented with the aid of one or more commercially available personal computers on which an operating system, such as for instance Microsoft Windows, MacOS or Linux, and one or more control programs by way of which example embodiments of the novel method are implemented are run. In some example embodiments, the controller 32 may be implemented in the form of a soft SPS on a commercially available PC. As an alternative or in addition, the controller 32 may be implemented with the aid of dedicated control hardware comprising one or more ASICs, FPGAs, microcontrollers, microprocessors or comparable logic circuits.

The apparatus 10 furthermore may have a measuring arrangement 38, 40 that is configured to inspect the surface of the layer stack. The measuring arrangement may contain an illumination arrangement 38 and a camera 40 that are each connected to the controller 32 (or to a separate controller for the measuring arrangement, not illustrated here). In this preferred example embodiment, the camera 40 may be configured to record multiple images of the surface of the material stack, wherein the surface is illuminated from different directions. By way of example, the illumination arrangement 38 here may contain a plurality of illumination modules 38*a*-38*f* that are arranged at different positions relative to the production platform 12. As an alternative or in addition, the illumination arrangement 38 may be movable relative to the production platform 12 in order to illuminate the material surface from different directions. By way of example, the production platform 12 could be arranged on a turntable.

In FIG. 1, three illumination modules 38*a*, 38*b*, 38*c* are arranged next to one another. The illumination modules 38*a*, 38*b*, 38*c* are thus capable of producing three largely parallel-running illumination directions 42*a*, 42*b* (not illustrated here), 42*c*. Three further illumination modules 38*d*, 38*e*, 38*f* may be arranged here on a second side of the production platform 12, transverse to the illumination modules 38*a*, 38*b*, 38*c* and parallel to one another. The illumination modules 38*d*, 38*e*, 38*f* may be able to produce three further illumination directions 42*d* (not illustrated here), 42*e*, 42*f*. In some example embodiments, the apparatus 10 may have six further illumination modules (not illustrated here), three of which may be arranged opposite the illumination modules 38*a*-38*c* and three more of which may be arranged opposite the illumination modules 38*d*-38*f*. In example embodiments, the apparatus 10 may be able to illuminate the material surface from at least three different main directions. In some example embodiments, the main directions may each contain three illumination sub-directions that are offset parallel to one another, as illustrated in FIG. 1. This allows highly advantageous determination of a 2.5D elevation map of the material surface in accordance with a method as described in DE 10 2017 108 874 A1 mentioned at the outset or US 2020/158499 A1 of the same priority. Both documents are hereby incorporated by reference.

As an alternative or in addition to the arrangement illustrated in FIG. 1, the apparatus 10 could have a ring light having a plurality of light sources able to be driven individually and/or in segments, wherein the ring light (not illustrated) is for example arranged above the production platform 12 and preferably around the material stack in order to allow illumination of the material surface 18 from different directions.

Example embodiments of methods that are able to be implemented on the apparatus according to FIG. 1 with the aid of one or more control programs are explained below with additional reference to FIGS. 2 to 6. In step 50, a dataset 36 that defines the workpiece 14 in a plurality of workpiece layers arranged one on top of the other 16 is read into the controller 32. As an alternative or in addition thereto, the controller 32 could first receive, via the interface 34, a dataset that defines the workpiece to be manufactured "as a whole", for instance a CAD dataset, and determine the plurality of workpiece layers arranged one on top of the other 16 based thereon. In this case too, the controller 32 ultimately receives a dataset that defines the workpiece 14 in a plurality of workpiece layers arranged one on top of the other 16. In step 52, a material layer 18 is produced on the layer stack. By way of example, the controller 32 may take particulate material 20 from the reservoir 26 with the aid of the doctor blade 22 and distribute it over the layer stack. The distribution of the particulate material 20 should be as uniform and homogeneous as possible.

In step 54, the surface of the material layer 18 is then inspected with the aid of the measuring device 38, 40 in order to detect any anomalies, such as in particular ridges, holes, depressions, undulations, material agglomerations, thickness variations and/or particle inhomogeneities (for example clumping) in the material layer 18. If the surface of the new material layer 18 corresponds to all desired criteria, the method, in step 56, branches to step 58, in which a new workpiece layer 16 is produced in the uppermost material layer 18 with the aid of the writing laser 28. The writing laser 28 may selectively melt material particles along the defined trajectory and thereby connect the melted particles, or the particles that have started to be melted, to one another.

If the surface of the new material layer 18 does not, or not sufficiently, correspond to the desired criteria, the method may, in loop 60, return to step 52 in order to rework or to completely reproduce the surface of the material layer 18. In step 62, steps 52-58 are repeated until the workpiece 14 is finished in accordance with the dataset 36.

In some example embodiments, a freshly manufactured workpiece layer 16 may be inspected in a targeted manner with the aid of the measuring device 38, 40, this being indicated with reference numeral 64. Based on this, a subsequent workpiece layer may then be modified, in order for instance to correct a shape or size discrepancy. In step 66, the manufactured workpiece may be authorized for an intended use based on the history of the inspections from the repeated steps 52 and/or 64.

Figure 2:
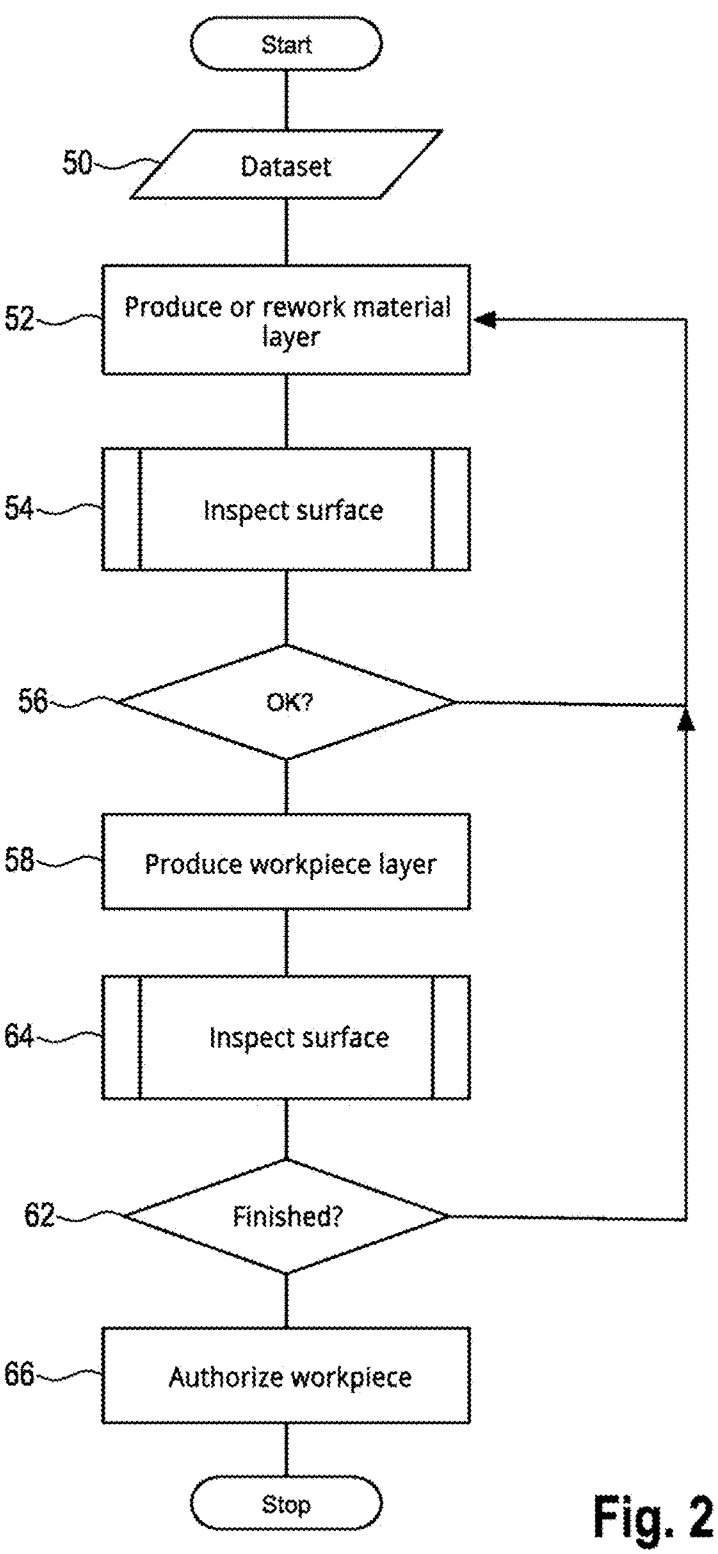
FIG. 2 is a flowchart for explaining an example embodiment of the novel method.
Figure 3:
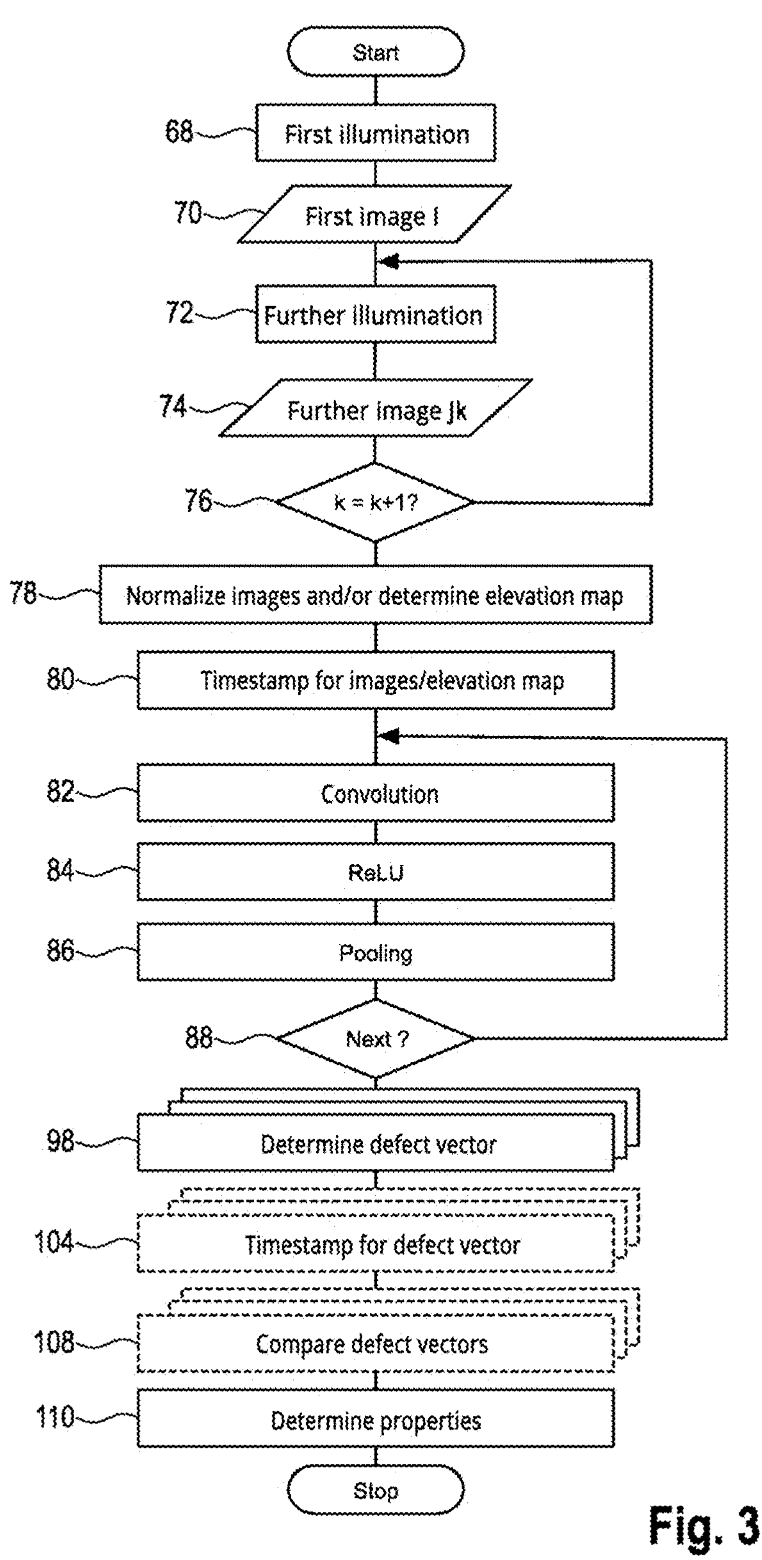
FIG. 3 is a flowchart for explaining the inspection of the material surface according to example embodiments of the method from FIG. 2.

FIG. 3 shows an example embodiment for the inspection of the material layer 18 in step 54 and possibly step 64 from FIG. 2. The surface of the material layer 18 may preferably be illuminated here with short-wave light. In step 68, the material surface is illuminated here from a first direction. The first direction may for example be the illumination direction 42*a* according to FIG. 1. In step 70, a first image I of the illuminated material surface is recorded with the aid of the camera 40. In step 72, the material surface is then illuminated from a further direction, for example from the illumination direction 42*c* according to FIG. 1. In step 74, a further image $J_k$ of the material surface is recorded with the aid of the camera 40, while the material surface is being illuminated from the further direction 42*c*. In step 76, a decision is made as to whether further images of the material surface with illuminations from further directions should be recorded, for instance from the illumination directions 42*e*, 42*f* according to FIG. 1. In some example embodiments, the first illumination 68 and the further illuminations 72 may be produced simultaneously with the aid of mutually different wavelengths/light colors and the different images may be separated from one another based on the different wavelengths/light colors.

In step 78, the recorded images, in some preferred example embodiments, may be normalized using a respectively selected reference image in order to obtain a uniform illumination level independently of the arrangement of the illumination modules in the working space of the device 10 and any production tolerances. In some example embodiments, the reference image may show a white sheet of paper that has been recorded by the camera 40. In other example embodiments, the recorded images may each be normalized with an associated reference image that shows a defect-free material layer comprising the particulate material and in each case the same illumination as the illumination of the recorded image that is normalized. In some example embodiments, a 2.5D elevation map of the material surface 18 may be determined using the recorded and possibly normalized images, as has already been mentioned further above with reference to DE 10 2017 108 874 A1 or US 2020/158499 A1. In step 80, the elevation map and/or the normalized images are provided here with a respective timestamp that is representative of the material layer 18 currently being recorded. In some example embodiments, the timestamp may, independently of the current time, be a sequential number that is incremented with each new material layer 18.

In steps 82, 84, 86, 88, the elevation map and/or the normalized images from step 78 are supplied to a previously trained statistical learning model, which is preferably implemented here as a convolutional neural network. The basic operation of such a network is explained in more detail in FIGS. 4 to 6.

Figure 4:
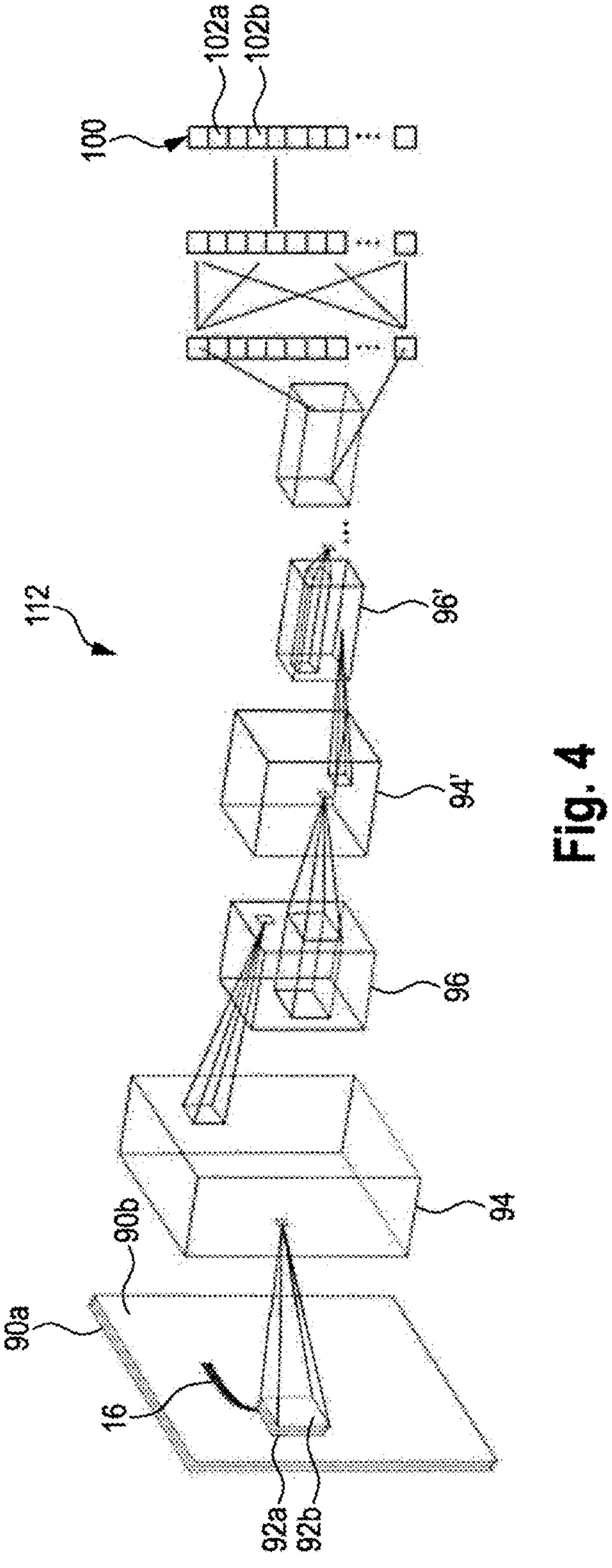
FIG. 4 is a simplified illustration for explaining the operation of a convolutional neural network that may advantageously be used in example embodiments of the novel method and of the novel device.

According to FIG. 4, the statistical learning model is supplied here with one or more images 90*a*, 90*b* of the material surface 18 as input dataset. In some example embodiments, the image 90*a* may include a current elevation map of the uppermost material layer 18 and the image 90*b* may include the elevation map of a previous material layer located further below. Multiple such historical elevation maps of previous material layers of the layer sequence may be supplied to the statistical learning model together with a current elevation map. By way of example, the stack of input images 90*a*, 90*b* may include elevation maps of two, three, four or five previous material layers.

In other example embodiments, the stack of input images 90*a*, 90*b* may include in each case current—preferably normalized—images of the uppermost material layer 18 with a respective different illumination direction. The determination of an elevation map may accordingly be dispensed with in these example embodiments. In further example embodiments, the stack of input images 90*a*, 90*b* may include current and historical images each with different illumination directions. In further example embodiments, the stack of input images 90*a*, 90*b* may include current and/or historical images each with different illumination directions and one or more (current and/or historical) elevation maps.

The input images 90*a*, 90*b* may then each be convolved with one or more filter masks 92*a*, 92*b*. The convolution operations lead to an image stack 94 in which the respective convolution result is contained for each input image 90*a*, 90*b* and each filter mask 92*a*, 92*b*. In some preferred example embodiments, the stack 94 may furthermore include a step that is known to those skilled in the art as a ReLU step. The stack 94 is delinearized in a targeted manner using the ReLU step (step 84 according to FIG. 3). According to FIG. 3, this may then be followed by what is known as a pooling step, which may be implemented in particular as what is known as Max pooling. The pooling step 86 produces a stack 96 in which redundant image information is reduced. Steps 82, 84, 86 may be repeated multiple times, as indicated with reference numeral 88 in FIG. 3, wherein the stack from the previous steps serves in each case as input dataset for the further convolution and pooling steps. In some example embodiments, between three and ten convolution steps 82, ReLU steps 84 and pooling steps 86 may be carried out in cascaded succession. It is also possible to perform sequences of multiple convolution steps and/or delinearization steps before a respective pooling step is performed.

With reference to FIG. 3, in a further step 98, one or more defect vectors 100 may be determined, in particular using what is known as the Softmax function, which delivers a probability distribution on the basis of the previous stack 96'. Each defect vector 100 therefore includes a plurality of individual defect probabilities 102*a*, 102*b*, wherein each individual defect probability 102*a*, 102*b* is an individual indicator as to whether a defined layer defect from the plurality of abovementioned layer defects is present in the inspected material layer 18.

The possible layer defects correlate with the filter matrices 92*a*, 92*b*, which may in turn be determined beforehand based on provided training data. In some preferred example embodiments, the training data contain elevation maps and/or normalized images of material surfaces that contain one or more of the abovementioned layer defects and also at least one elevation map and/or images of a material surface that is defect-free. In order to generate such training data, a manufacturing process may be disrupted in a targeted manner, for example by overfilling with powder material, introducing ridges or undulations on the material surface, mechanical shaking, targeted incorrect driving of the printing process, such as for instance excessively fast movement of the writing laser and/or excessively high writing intensity and the like. Images or elevation maps recorded in this way may also be mirrored or manipulated using image processing methods in order to obtain a large variety of training data. The training data are preferably supplied beforehand to the convolutional neural network 112 in multiple training cycles. The resulting defect vectors may be analyzed for each supplied training dataset. Various defect metrics are conceivable for the analysis, these being able to be optimized during the learning steps, such as for example the mean error over all pixels of the defect map (usually cross-entropy) or perceptual defect metrics (for instance adversarial losses). As part of what is known as a backpropagation algorithm, the parameters of the filter masks 92*a*, 92*b* are modified using a suitable optimization method until the selected objective functions are sufficiently optimized, for instance until the resulting defect vectors correctly represent the layer defects in the training data. Such an optimization method may preferably include a gradient descent variant (for example stochastic gradient descent with or without Momentum, Adam, RMSProp and the like). The backpropagation algorithm may preferably be used to efficiently calculate the gradients. As an alternative, the stopping point may also be earlier, if for instance a previously defined training time budget is consumed or if the model error during training, evaluated on a separate validation dataset, does not drop any further. The statistical learning model may then be sufficiently trained.

In addition to the above explanations, reference is made here by way of example to a few publications that describe the implementation of an advantageous convolutional neural network and that are hereby incorporated by reference, namely:

- Ronneberger, O.; Fischer, P.; Brox, T., "U-Net: Convolutional Networks for Bio-medical Image Segmentation", Medical Image Computing and Computer-Assisted Intervention (MICCAI), 2015;
- Milletari F, Navab N, Ahmadi S A. V-net: "Fully convolutional neural networks for volumetric medical image segmentation"; In 2016 Fourth International Conference on 3D Vision (3DV) 2016 Oct. 25 (pp. 565-571), IEEE;
- Diba A, Fayyaz M, Sharma V, Karami A H, Arzani M M, Yousefzadeh R, Van Gool L., "Temporal 3d convnets: New architecture and transfer learning for video classification" arXiv preprint arXiv:1711.08200, 2017 Nov. 22;
- Nabavi, Seyed & Rochan, Mrigank & Yang, & Wang, (2018). "Future Semantic Segmentation with Convolutional LSTM";
- Xingjian S H, Chen Z, Wang H, Yeung D Y, Wong W K, Woo W C. Convolutional LSTM network: A machine learning approach for precipitation nowcasting. In Advances in neural information processing systems 2015 (pp. 802-810);
- Saeid Asgari Taghanaki, Kumar Abhishek, Joseph Paul Cohen, Julien Cohen-Adad, Ghassan Hamarneh, "Deep Semantic Segmentation of Natural and Medical Images: A Review"; https://arxiv.org/pdf/1910.07655.pdf.

With renewed reference to FIG. 3, the defect vectors may be determined, in step 98, in some example embodiments, for each pixel of the elevation map and/or for each pixel of the normalized images, so as to give the probability of the presence of layer defects on the pixel level. In other example embodiments, an individual defect vector may be determined for the material layer 18 to be inspected, or it is possible, within the material layer 18, to define subregions for each of which an individual defect vector is determined with the aid of the convolutional neural network.

In step 104, in some example embodiments, the defect vectors may be provided with a respective timestamp that identifies the material layer currently being inspected. The defect vectors provided with the timestamp may be stored as historical defect vectors in a memory 106 (see FIG. 1). In step 108, the respective current defect vectors may be compared with the historical defect vectors from the memory 106 in order to identify layer defects that are persistent across multiple material layers. Conversely, layer defects that are detected for example only in a current material layer and that do not appear in subsequent material layers either may be discarded as "outliers". In some example embodiments, the defect vectors may be compared in step 108 as part of a determined comparison.

As already indicated with reference to FIG. 4, historical layer defect information may be supplied to the statistical learning model in further example embodiments as a stack of elevation maps or input images 90*a*, 90*b*, such that the resulting defect vectors 100 already represent the individual defect probabilities taking into consideration the persistence of any layer defects. In step 110, the individual properties of the material layer 18, in particular the presence or absence of defined layer defects, are determined based on the defect probabilities 102*a*, 102*b* of the defect vectors. In some example embodiments, in step 110, the extent and/or shape of the recognized layer defects is determined by comparing the defect vectors/defect probabilities for different pixels or pixel regions. Advantageously, the inspected material surface is segmented into defect-free subregions and defective subregions and classified in step 110, wherein a distinction is drawn between different defective subregions depending on the type of respectively recognized layer defect. Based on these properties, in step 56 from FIG. 2, a decision is made as to whether and how the method for manufacturing the workpiece is continued.

Figure 5:
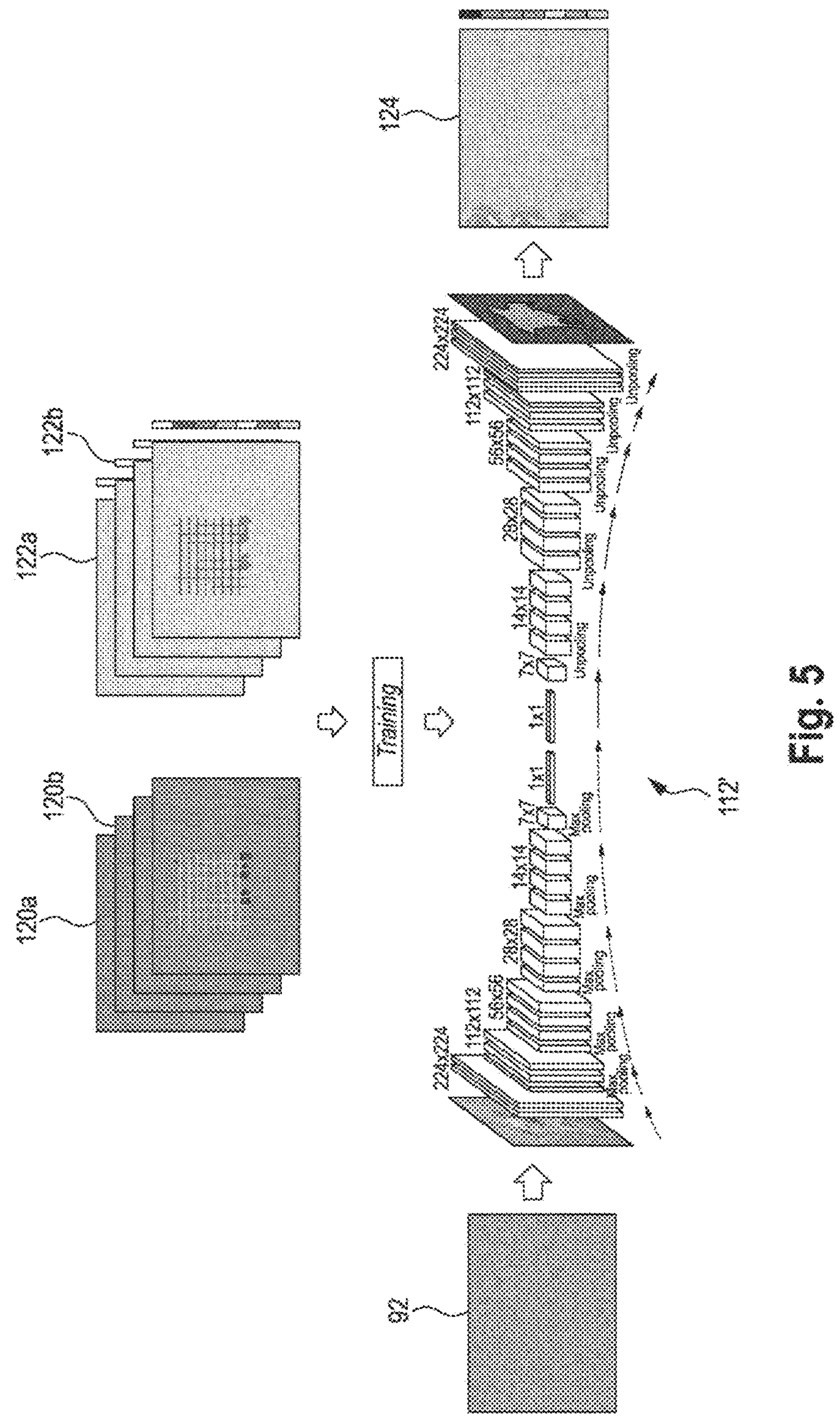
FIG. 5 is a simplified illustration of one example embodiment having an encoder/decoder architecture.

FIG. 5 shows, with reference to a simplified illustration, a further example embodiment of the novel method and an example embodiment for the training of the statistical learning model. The same reference signs denote the same elements as previously. As already indicated further above, the statistical learning model 112' may be trained based on training data that contain in particular groups of normalized images of material surfaces that each have one or more of the layer defects to be detected. In the illustrated example embodiment, the training data contain a plurality of training images 120*a*, 120*b* and also annotated versions 122*a*, 122*b* of the training images 120*a*, 120*b*. The layer defects to be detected are marked in the annotated versions 122*a*, 122*b*. The annotated versions 122*a*, 122*b* accordingly represent a target result that the statistical learning model 112' is intended to deliver after training is complete if it is supplied with the training images 120*a*, 120*b* again as input data. In an iterative optimization process, the filter masks 92*a*, 92*b* for the convolution operations of the statistical learning model 112' (cf. FIG. 4) are modified, for instance with stochastic gradient descent with or without Momentum, Adam, RMSProp and the like, until the statistical learning model 112' delivers the annotated versions 122*a*, 122*b* as part of a defined defect criterion and/or stop criterion. The annotated versions 122*a*, 122*b* may advantageously be produced by an experienced expert with the aid of a visual inspection of the training images 120*a*, 120*b* and individual marking of the recognized layer defects. After the statistical learning model 112' has been trained sufficiently, it is supplied, in preferred example embodiments of the methods for the additive manufacture of a workpiece, with the respectively current images 92 and preferably also historical images of previous material layers and/or current elevation maps and/or historical elevation maps. In one preferred example embodiment, in order to inspect each new material layer 16, 18, in each case at least three and in particular four current and preferably normalized images of the new material layer ("normalized raw images", possibly following rectification, but without an elevation map) with mutually different illumination directions are used, whereas the annotated versions 122*a*, 122*b* may be produced with the additional use of elevation maps. In further example embodiments, the training images 120*a*, 120*b* may be images that are recorded during the layered manufacture of a specified workpiece in accordance with the novel method and that thus show a plurality of material layers that were produced in the course of the manufacturing process. The statistical learning model may be retrained using these training images and be optimized with regard to the manufactured workpiece.

In the example embodiment illustrated here, use is made of a statistical learning model 112' that has an encoder/decoder architecture. Such an architecture may advantageously be used to determine not only a single defect vector 100. On the contrary, it is possible, through deconvolution steps, to create a defect map 124 that represents recognized layer defects in a spatially resolved manner. By way of example, the defect map 124 may contain an individual defect probability or a defect vector containing a plurality of individual defect probabilities for each pixel, wherein the defect probabilities are each representative of whether the respective pixel shows a layer defect to be detected.

Figure 6:
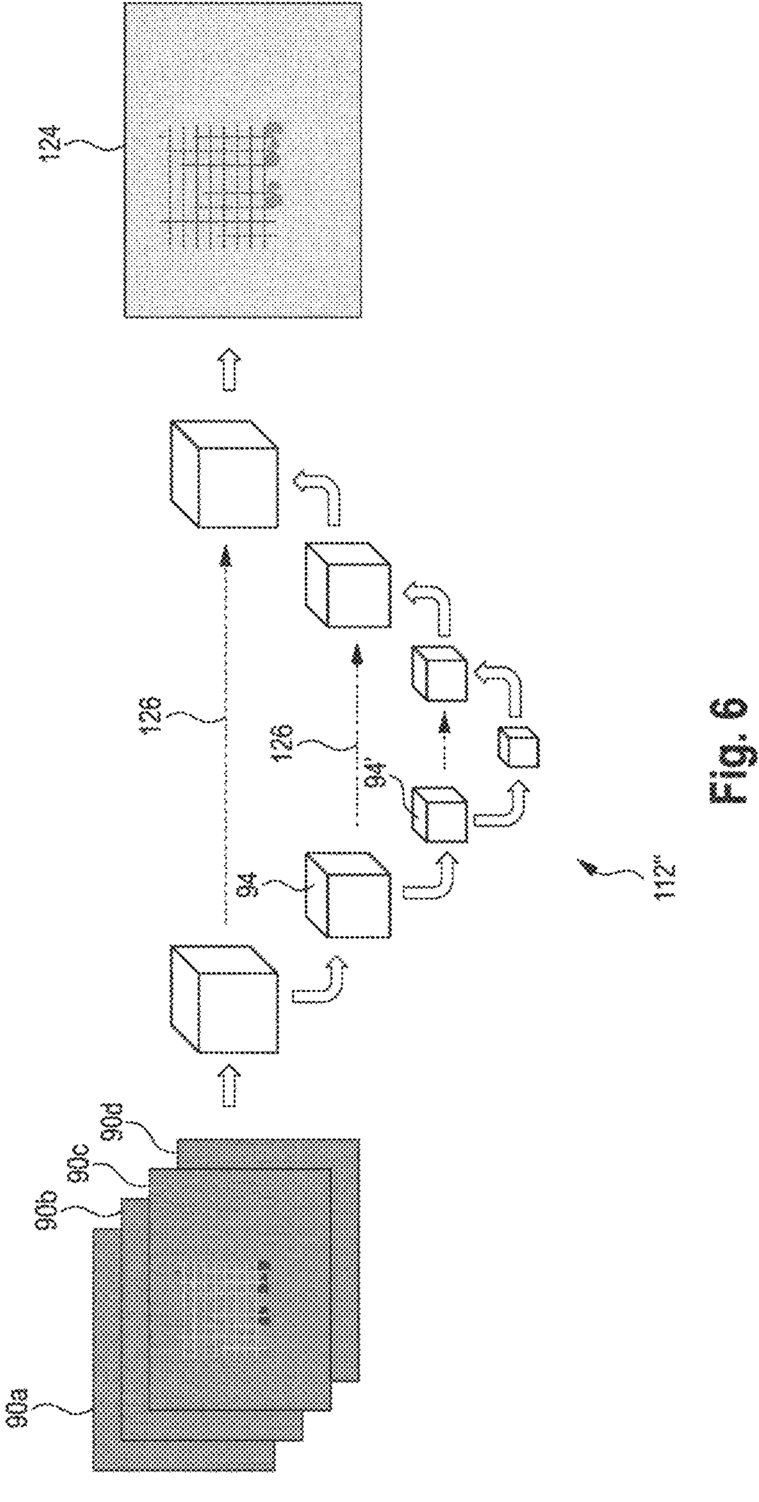
FIG. 6 is a simplified illustration of a further example embodiment having an encoder/decoder architecture.

FIG. 6 shows a further statistical learning model 112" having an encoder/decoder architecture. The learning model 112" is supplied here with four respectively current images 92*a*, 92*b*, 92*c*, 92*d* of the material layer 16, 18 to be inspected, each with a different illumination direction, as input data. The images 92*a*, 92*b*, 92*c*, 92*d* may be normalized and rectified. Optionally, historical images and/or current and historical elevation maps may additionally be supplied to the statistical learning model 112" as input data. The statistical learning model 112", in numerous successive convolution steps, delinearization steps and pooling steps, determines a plurality of increasingly filtered image stacks 94, 94'. The image stacks are then deconvolved again in an upsampling path. In the deconvolution steps, the respective stacks are combined, for example concatenated, here with the respective intermediate results from the previous convolution steps, as indicated by the arrows 126. Such a statistical learning model 112" is advantageously based on the abovementioned U-net model. As a result, the statistical learning model 112" delivers a defect map 124 containing spatially resolved defect probabilities that locally represent the presence or absence of layer defects. The defect map 124 here contains a plurality of defect vectors containing a plurality of individual defect probabilities, preferably for each pixel of the images 92*a*, 92*b*, 92*c*, 92*d*. Such a defect map 124 may advantageously be used to determine the spatial dimensions of detected layer defects.

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A method for additive manufacture of a workpiece, the method comprising:

obtaining a dataset that defines the workpiece in a plurality of workpiece layers arranged one on top of another;

producing a respective material layer having a defined material surface formed from a particulate material;

recording at least one image of the respective material layer;

feeding the at least one image to a previously trained statistical learning model in order to determine at least one defect vector representing a plurality of individual defect probabilities, wherein each individual defect probability from the plurality of individual defect probabilities represents an individual indicator as to whether or not a defined layer defect from a plurality of possible layer defects is present in the respective material layer;

in response to the plurality of individual defect probabilities indicating that no defined layer defect from the plurality of possible layer defects is present in the respective material layer, selectively solidifying the particulate material on the defined surface using a structuring tool based on the dataset in order to thereby produce a defined workpiece layer from the plurality of workpiece layers;

in response to the plurality of individual defect probabilities indicating that at least one defined layer defect from the plurality of possible layer defects is present in the respective material layer, reworking or reproducing the respective material layer, and repeating the recording and the feeding in order to determine the at least one defect vector again; and repeating the producing, the recording, the feeding, and the selectively solidifying such that further defined workpiece layers from the plurality of workpiece layers are produced one on top of another, wherein the respective material layers each are inspected using the previously trained statistical learning model.

2. The method of claim 1 wherein:

the respective material layer is illuminated from a plurality of mutually different directions;

a plurality of images of the respective material layer is recorded;

each image from the plurality of images shows the respective material layer with a different illumination direction; and the at least one defect vector is determined using the plurality of images.

3. The method of claim 2 wherein the plurality of images together is fed to the previously trained statistical learning model as input data.

4. The method of claim 1 wherein an elevation map of the respective material layer is determined using the at least one image, and wherein the elevation map is fed to the previously trained statistical learning model as input data.

5. The method of claim 1 wherein:

the at least one defect vector includes a plurality of defect vectors;

each defect vector from the plurality of defect vectors represents a plurality of individual defect probabilities; and each defect vector from the plurality of defect vectors represents individual defect probabilities in relation to a selected pixel region in the at least one image.

6. The method of claim 5 wherein each defect vector from the plurality of defect vectors represents the individual defect probabilities in relation to another individual pixel in the at least one image.

7. The method of claim 5 wherein at least one of morphological or dimensional properties of a defined defect in the material layer are determined using the plurality of defect vectors.

8. The method of claim 1 wherein the previously trained statistical learning model comprises a convolutional neural network.

9. The method of claim 8 wherein the convolutional neural network has an encoder/decoder architecture.

10. The method of claim 1 wherein:
the at least one image of the respective material layer is normalized based on a reference image; and
the reference image shows a homogeneous, diffusely reflective surface or a defect-free material layer.

11. The method of claim 1 wherein:
the at least one defect vector is stored, together with a timestamp that identifies the respective material layer, as a historical defect vector, and
the further defined workpiece layers are produced based on the historical defect vector.

12. The method of claim 1 wherein:
the at least one image of the respective material layer is stored, together with a timestamp that identifies the respective material layer, as at least one historical image; and
the further defined workpiece layers are produced based on the at least one historical image.

13. The method of claim 1 wherein:
individual properties of the respective material layer are stored together with a respective timestamp that identifies the respective material layer, and
the workpiece is authorized for use based on the individual properties of each respective material layer.

14. A method for training a statistical learning model, the method comprising:
obtaining a plurality of training images that show a plurality of particulate material layers, wherein the plurality of particulate material layers shown in the plurality of training images contain a plurality of possible layer defects;
marking the plurality of possible layer defects in the plurality of training images in order to obtain a plurality of annotated versions of the plurality of training images;
defining a stop criterion based on the plurality of annotated versions of the plurality of training images;
repeatedly feeding the plurality of training images to the statistical learning model as input data and repeatedly obtaining output data from the statistical learning model in response to the plurality of training images, wherein:
the output data includes at least one defect vector representing a plurality of individual defect probabilities, and
each individual defect probability from the plurality of individual defect probabilities represents an individual indicator as to whether or not a defined layer defect from the plurality of possible layer defects is present in a respective particulate material layer; and
iteratively optimizing the statistical learning model using the plurality of training images and the stop criterion.

15. The method of claim 14 wherein the plurality of training images are recorded while manufacturing of a defined workpiece.

16. The method of claim 15 wherein the stop criterion is defined based on the defined workpiece.

17. The method of claim 15 wherein the stop criterion is at least one of a defect criterion or a time criterion.

18. A method for additive manufacture of a workpiece, the method comprising:
obtaining a dataset that defines the workpiece in a plurality of workpiece layers arranged one on top of another,
producing a material layer having a defined surface formed from a particulate material,
recording at least one image of the material layer and inspecting the material layer based on the at least one image in order to determine individual properties of the material layer,
selectively solidifying the particulate material on the defined surface using a structuring tool based on the dataset and based on the individual properties of the material layer, such that a defined workpiece layer from the plurality of workpiece layers is produced from the material layer, and
repeating the producing, the recording, and the selectively solidifying such that further defined workpiece layers from the plurality of workpiece layers are produced, wherein:
the at least one image of the material layer is inspected using a previously trained statistical learning model,
the previously trained statistical learning model is used to determine at least one defect vector that represents a plurality of individual defect probabilities,
each individual defect probability from the plurality of individual defect probabilities is an individual indicator as to whether or not a defined layer defect from a plurality of possible layer defects is present in the material layer, and
the selectively solidifying is carried out based on the at least one defect vector.

19. An apparatus for additive manufacture of a workpiece, the apparatus comprising:
a memory configured to store a dataset defining the workpiece in a plurality of workpiece layers arranged one on top of another;
a production platform;
a layer-forming tool;
a structuring tool;
a camera oriented toward the production platform; and
an evaluation and control unit configured to:
produce a material layer having a defined surface from a particulate material on the production platform using the layer-forming tool,
record at least one image of the material layer using the camera,
feed the at least one image to a previously trained statistical learning model in order to determine at least one defect vector representing a plurality of individual defect probabilities, wherein each individual defect probability from the plurality of individual defect probabilities represents an individual indicator as to whether or not a defined layer defect from a plurality of possible layer defects is present in the respective material layer, in response to the plurality of individual defect probabilities indicating that no defined layer defect from the plurality of possible layer defects is present in the respective material layer, selectively solidify the particulate material on the defined surface using the structuring tool such that a defined workpiece layer from the plurality of workpiece layers is produced from the material layer, and in response to the plurality of individual defect probabilities indicating that at least one defined layer defect from the plurality of possible layer defects is present in the respective material layer, rework or reproduce the respective material layer.

* * * * *